US009977592B2

(12) United States Patent
Hsiao et al.

(10) Patent No.: US 9,977,592 B2
(45) Date of Patent: May 22, 2018

(54) TOUCH RIM CONTROL METHOD AND ASSOCIATED DEVICE

(71) Applicant: MediaTek Inc., Hsin-Chu (TW)

(72) Inventors: Chih-Hsiang Hsiao, Taipei (TW); Wei-Ting Wang, Taipei (TW); Chung-Jen Kuo, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 31 days.

(21) Appl. No.: 14/818,597

(22) Filed: Aug. 5, 2015

(65) Prior Publication Data

US 2016/0124601 A1 May 5, 2016

Related U.S. Application Data

(60) Provisional application No. 62/130,619, filed on Mar. 10, 2015, provisional application No. 62/072,627, filed on Oct. 30, 2014.

(51) Int. Cl.
| | |
|---|---|
| *G06F 3/0488* | (2013.01) |
| *G04G 21/08* | (2010.01) |
| *G06F 3/041* | (2006.01) |
| *G06F 3/044* | (2006.01) |

(52) U.S. Cl.
CPC ......... *G06F 3/04883* (2013.01); *G04G 21/08* (2013.01); *G06F 3/044* (2013.01); *G06F 3/0416* (2013.01); *G06F 2203/0339* (2013.01); *G06F 2203/04104* (2013.01); *G06F 2203/04106* (2013.01); *G06F 2203/04808* (2013.01)

(58) Field of Classification Search
CPC ................. G06F 3/04883; G06F 3/044; G06F 2203/0339; G06F 2203/04106; G06F 2203/04808; G06F 2203/04104; G04G 21/08
See application file for complete search history.

(56) References Cited

U.S. PATENT DOCUMENTS

| | | | | |
|---|---|---|---|---|
| 7,286,063 | B2 | 10/2007 | Gauthey et al. | |
| 2006/0066588 | A1* | 3/2006 | Lyon | G06F 3/044 345/173 |
| 2006/0250372 | A1* | 11/2006 | Lii | G06F 3/0416 345/173 |
| 2009/0059730 | A1* | 3/2009 | Lyons | G04G 21/04 368/69 |

(Continued)

OTHER PUBLICATIONS

Lambert, J.; "Apple 2014 iWatch Video, Photos: Fitness, Digital Crown, Style Customization, Display Resolution, Text Details and Specs Revealed;" Classicalite; downloaded on Jul. 27, 2015; pp. 1-3.

*Primary Examiner* — Mihir K Rayan

(74) *Attorney, Agent, or Firm* — McClure, Qualey & Rodack, LLP

(57) ABSTRACT

A portable device is provided. The portable device includes: a display; a controller, a processor, a housing, and a touch rim. The controller and the processor are installed inside the housing. The touch rim is configured to detect a gesture performed on the touch rim to generate at least one touch detection signal. The controller is configured to receive at least one detection signal from the touch rim, and to transmit the touch detection signal to the processor. The processor analyzes the touch detection signal to determine the gesture performed on the touch rim, and performs an operation associated with the gesture.

14 Claims, 21 Drawing Sheets

(56) References Cited

U.S. PATENT DOCUMENTS

| | | | | |
|---|---|---|---|---|
| 2010/0309147 A1* | 12/2010 | Fleizach | ............. | G06F 3/04883 345/173 |
| 2013/0234995 A1* | 9/2013 | Son | ......................... | G06F 3/043 345/177 |
| 2014/0104180 A1* | 4/2014 | Schaffer | .................... | G06F 3/02 345/169 |
| 2015/0109744 A1* | 4/2015 | Jufer | ...................... | G04G 17/06 361/752 |

* cited by examiner

TOUCH RIM CONTROL METHOD AND ASSOCIATED DEVICE

CROSS REFERENCE TO RELATED APPLICATIONS

This application claims the benefit of U.S. Provisional Application No. 62/072,627, filed on Oct. 30, 2014, and U.S. Provisional Application No. 62/130,619, filed on Mar. 10, 2015, the entireties of which are incorporated by reference herein.

BACKGROUND OF THE INVENTION

Field of the Invention

The invention relates to an electronic device, and, in particular, to a touch rim control method and associated device.

Description of the Related Art

Wearable devices, such as watches or other wrist-worn devices, are by nature relatively small in size, and may be less than 40 mm in diameter. A wearable electronic device with multiple functions such as data display, email, text messaging, and wireless communication requires the user to interact with the device to input data, scroll through software menus, etc. Due to the very limited viewing area of a wearable device such as a smart watch, it is very inconvenient for a user to precisely tap on a specific location on the touch screen of the smart watch because the user's finger may block the viewing area while performing operations on the touch screen. Accordingly, there is demand for a portable device to solve the aforementioned problem.

BRIEF SUMMARY OF THE INVENTION

A detailed description is given in the following embodiments with reference to the accompanying drawings.

A portable device is provided. The portable device includes: a display; a controller, a processor, a housing, and a touch rim. The controller and the processor are installed inside the housing. The touch rim is configured to detect a gesture performed on the touch rim to generate at least one touch detection signal. The controller is configured to receive the touch detection signal from the touch rim and transmit the touch detection signal to the processor. The processor analyzes the touch detection signal to determine the gesture performed on the touch rim, and performs an operation associated with the gesture.

A portable device is provided. The portable device comprises: a touch rim, configured to detect a gesture performed on the touch rim to generate at least one touch detection signal; and a controller is configured to receive the at least one detection signal from the touch rim, and transmit the at least one touch detection signal to the processor.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
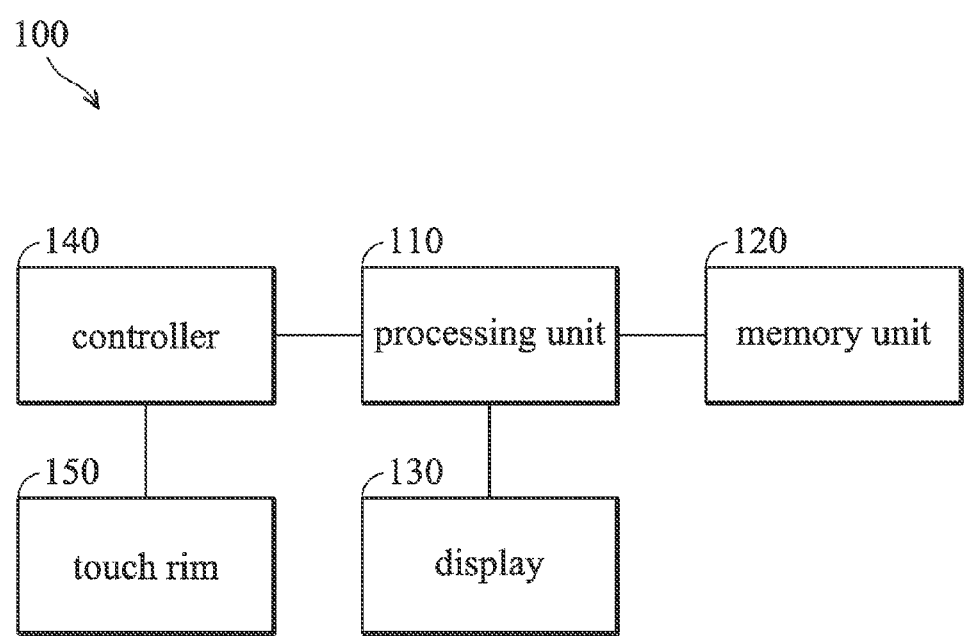
FIG. 1 is a block diagram of a portable device in accordance with an embodiment of the invention.

FIG. 1 is a block diagram of a portable device in accordance with an embodiment of the invention. The portable device 100 comprises a processing unit 110, a memory unit 120, a display 130, a controller 140 and a touch rim 150. The processing unit 110 may include one or more processors and/or controllers. The memory unit 120 may be applied as a main memory for the processing unit 110 for executing software routines and other storage functions. For example, the memory unit 120 may comprise a non-volatile memory and a volatile memory (not shown in FIG. 1). The non-volatile memory is capable of holding instructions and data without power and may store the software routines for controlling the portable device 100 in the form of computer-readable program instructions. The non-volatile memory, e.g. flash memory, ROM, etc., may also contain a user interface application, which provides functionality for the portable device 100 and can output a graphical user interface on the display 130, which may be a touch-sensitive display, i.e. a "touch screen".

Figure 2:
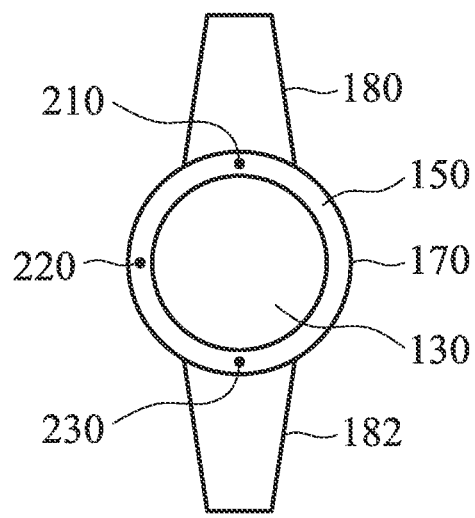
FIG. 2 is a top-view diagram of the portable device 100 in accordance with an embodiment of the invention.

FIG. 2 is a top-view diagram of the portable device 100 in accordance with an embodiment of the invention. The portable device 100 is exemplified as a smart watch in the embodiment. As shown in FIG. 1B, the portable device 100 further comprises a housing 170, and one or more straps 180 and 182 that may connect to opposite sides of the housing 170. The components of the portable device 100 shown in FIG. 1A are installed inside the housing 170. The display 130 is disposed on the upper surface of the housing 170. The touch rim 150 is disposed on the upper section of the housing 170 or disposed around the exterior side of the housing 170. For ease of description, the outline of the housing 170 is shown as a circle, but the invention is not limited thereto. One having ordinary skill in the art will appreciate that the outline of the housing 170 and the touch rim 150 in the invention can also be a rectangle, or any other shape. In an embodiment, the touch rim is disposed surrounding the display 130.

The touch rim 150 is configured to detect gestures performed on the touch rim 150 by the user, and to transmit corresponding detection signals to the controller 140. For example, the user may touch his finger(s) on one or more locations on the touch rim 150 to perform a gesture, thereby inputting a specific command to the portable device 100. Specifically, different combinations of tapping, sliding, or pressing operations on one or more locations on the touch rim 150 may be associated with different input commands to the portable device 100. The controller 140 is configured to receive the detection signals from the touch rim 150, and to transmit the detection signals to the processing unit 110. The processing unit 110 may then analyze the received detection signals and perform the corresponding operations associated with the detection signals.

FIGS. 3A~3M are diagrams of different gestures on the touch rim 150 accompanied with the embodiment of FIG. 2. In this embodiment, the trigger criteria for performing operations can be defined by using at least two fingers. Locations 210, 220, and 230 shown in FIG. 2 are not fixed, and the user may determine the locations for performing the gestures based on the size and shape of the portable device 100.

Figure 3A:
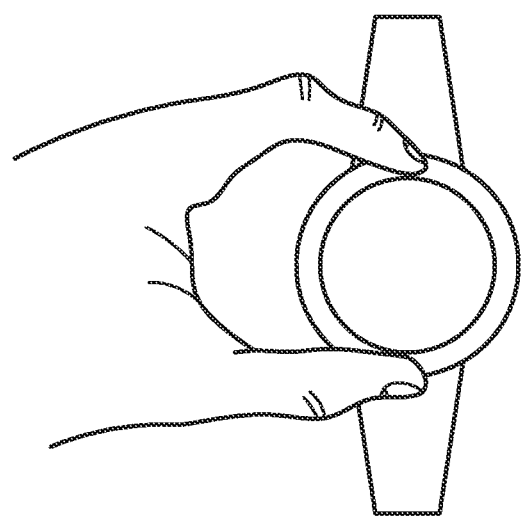
FIGS. 3A~3M are diagrams of different gestures on the touch rim accompanied with the embodiment of FIG. 2.
Figure 3B:
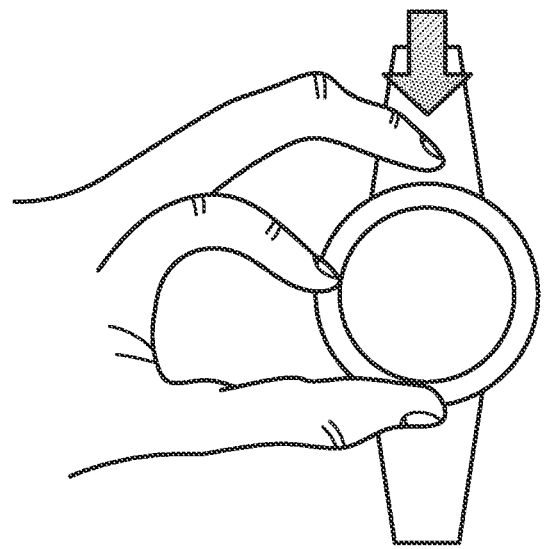

For example, as shown in FIG. 3A, an operation is performed by two fingers touching on locations 210 and 230 on the touch rim 150 for longer than a predetermined time, e.g. 1 second. As shown in FIG. 3B, two fingers are pressing on locations 220 and 230, and another finger taps on location 210 a predetermined number of times, e.g. tapping once or twice.

Figure 3C:
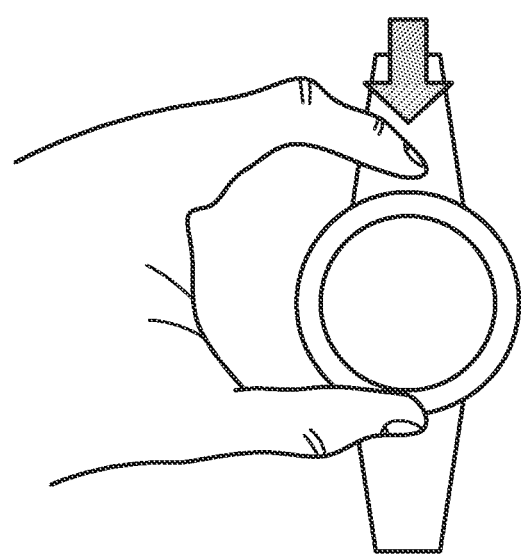
Figure 3D:
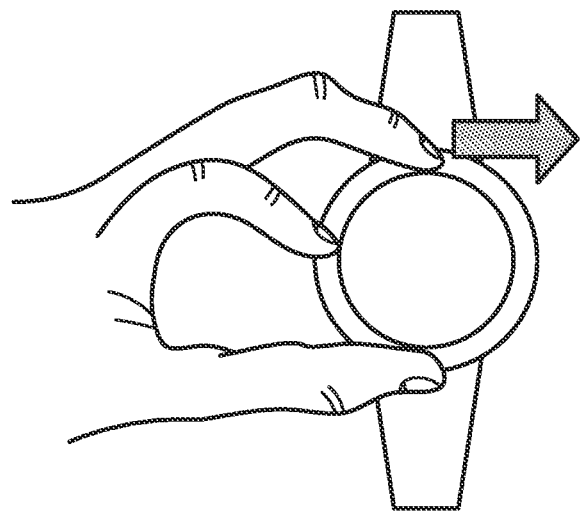
Figure 3E:
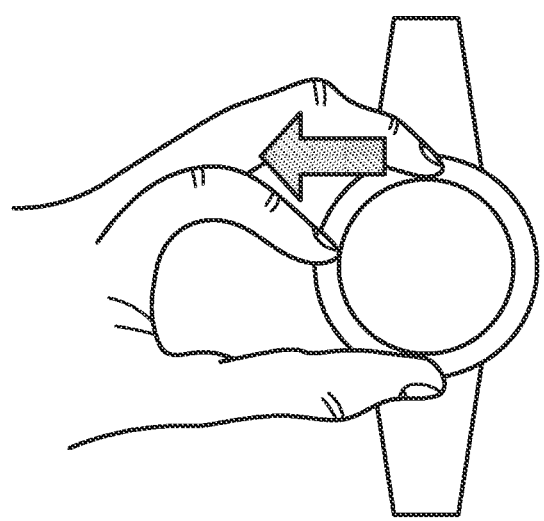

As shown in FIG. 3C, a finger is touching location 230, and another finger is tapping on location 210 a predetermined number of times (e.g. tapping once). As shown in FIG. 3D and FIG. 3E, two fingers are pressing on locations 220 and 230. Meanwhile, another finger touches location 210 and moves clockwise or counterclockwise on the touch rim 150 without losing contact.

Figure 3F:
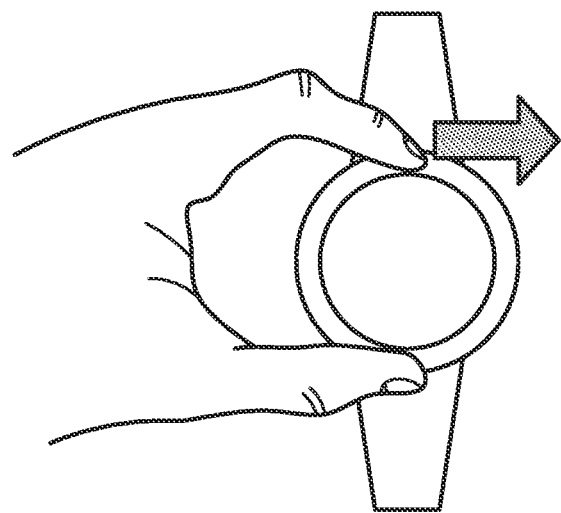
Figure 3G:
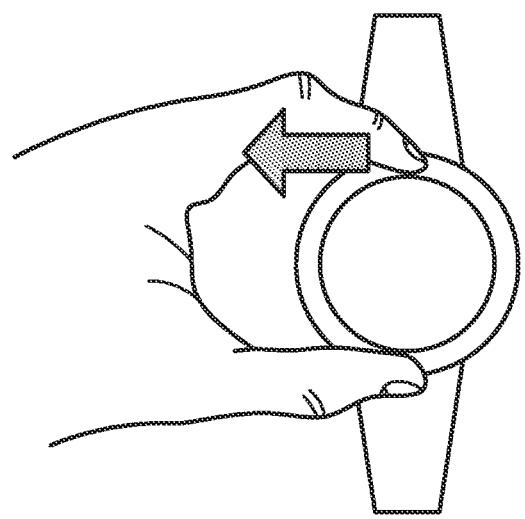

As shown in FIG. 3F and FIG. 3G, a finger is pressing on location 230, and another finger is touching location 210 and moving clockwise or counterclockwise on the touch rim 150 without losing contact.

Figure 3H:
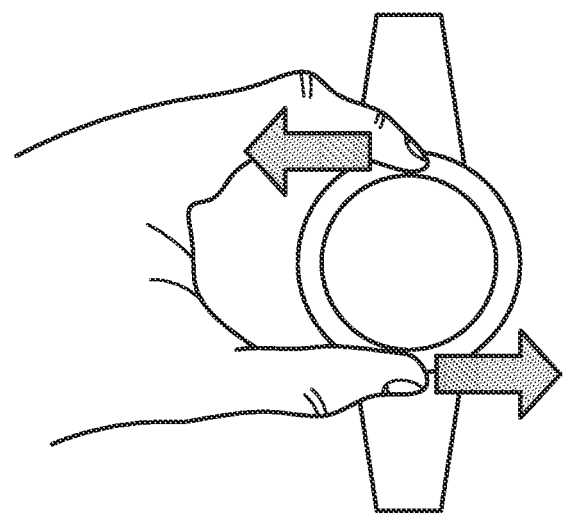
Figure 3I:
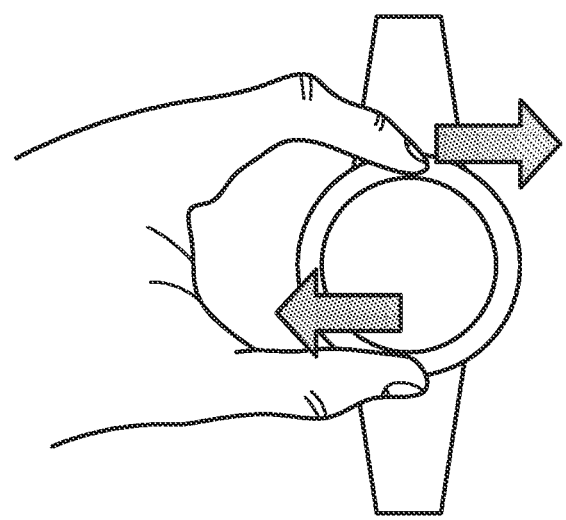

As shown in FIG. 3H and FIG. 3I, two fingers are first pressing on locations 210 and 230, respectively, and the two fingers are then sliding in the same direction, i.e. clockwise or counterclockwise, on the touch rim 150 without losing contact.

Figure 3J:
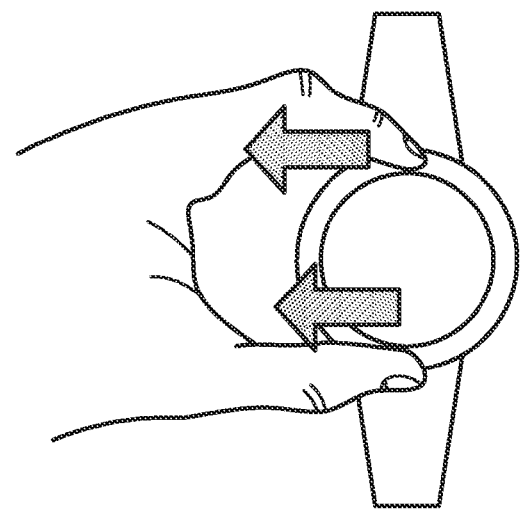
Figure 3K:
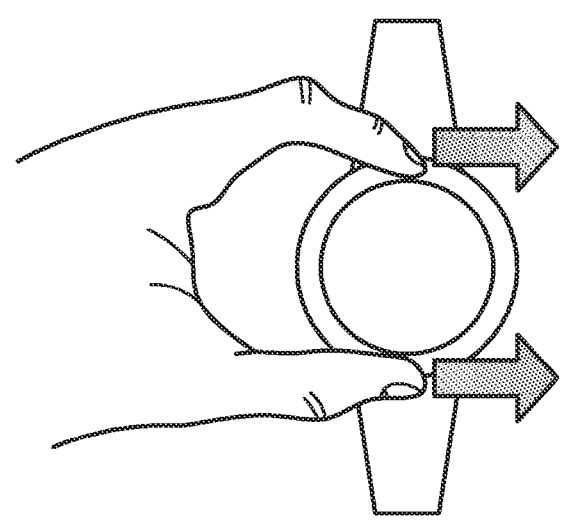

As shown in FIG. 3J and FIG. 3K, two fingers are first pressing on locations 210 and 230, respectively, and the two fingers are moving in opposite directions, i.e. one finger is moving clockwise on the touch rim 150 without losing contact, and the other finger is moving counterclockwise on the touch rim 150 without losing contact.

Specifically, in the embodiments shown in FIG. 3A~FIG. 3K, different combinations of tapping, pressing, and sliding operations on the touch rim 150 are used to generate different gestures. Since the gestures are performed on the touch rim 150, the user may easily input a specific command, e.g. magnifying, scrolling, or navigating content displayed on the display 130, by touching his or her fingers to perform a specific gesture on the touch rim 150. The gestures performed on the touch rim 150 will not block the screen of the display 130.

Figure 3L:
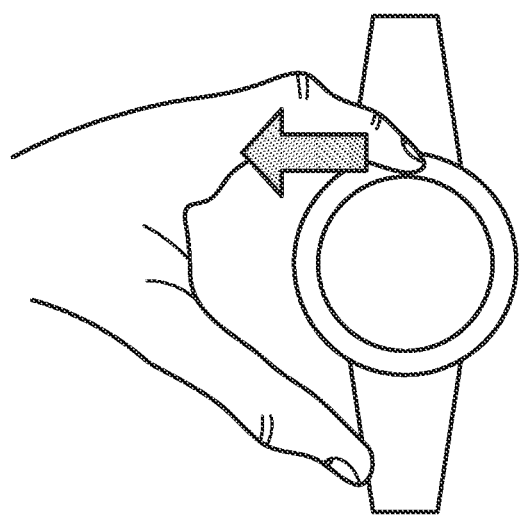
Figure 3M:
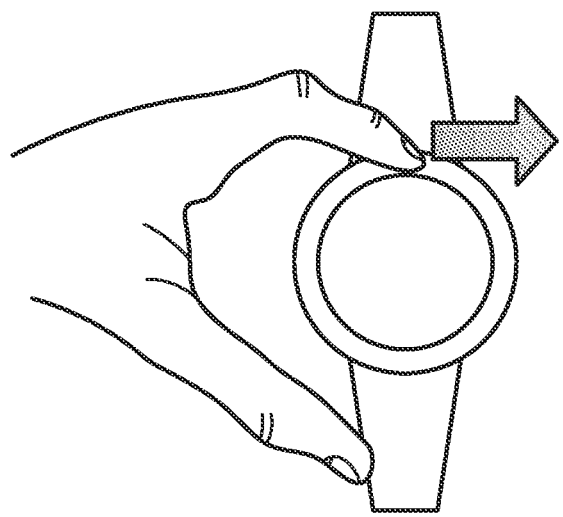

In an alternative embodiment, the gesture can be completed by using a single finger. For example, the user's finger may press on the location 210 and slide clockwise or counterclockwise on the touch rim 150 without losing contact, as shown in FIG. 3L and FIG. 3M, respectively.

Figure 4A:
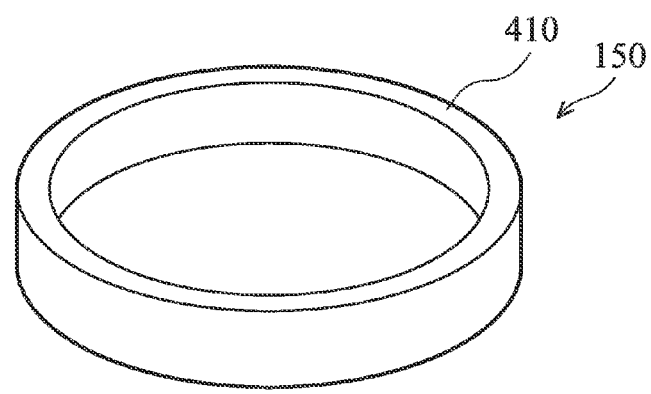
FIG. 4A is a diagram of the touch rim in accordance with an embodiment of the invention.

FIG. 4A is a diagram of the touch rim 150 in accordance with an embodiment of the invention. The rim 410 of the touch rim 150 is made of a non-conductive material, such as enhanced porcelain, fiberglass, plastic steel, and the like, thereby ensuring the sturdiness of the touch rim 150.

Figure 4B:
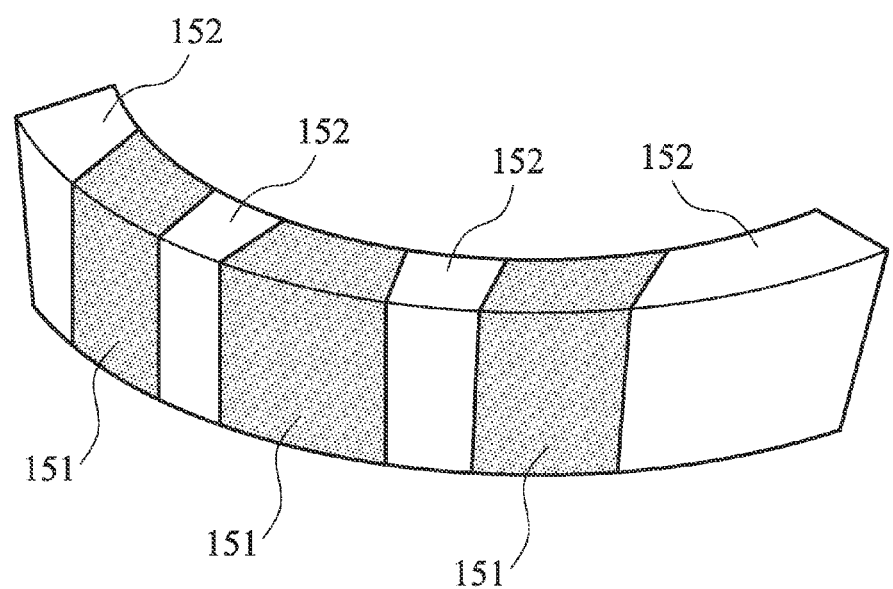
FIG. 4B is an enlarged view of a section of the touch rim 150 in accordance with the embodiment of FIG. 4A.

FIG. 4B is an enlarged view of a section of the touch rim 150 in accordance with the embodiment of FIG. 4A. In an embodiment, a conductive material is coated or covered on a plurality of segments of the rim 410, and the coated rim 410 is divided into a plurality of conductive segments 151 and a plurality of non-conductive segments 152. In addition, every two neighboring conductive segments 151 are separated by a non-conductive segment 152, as shown in FIG. 4B. It should be noted that each of the conductive segments 151 is independent and does not conduct with the others.

Figure 4C:
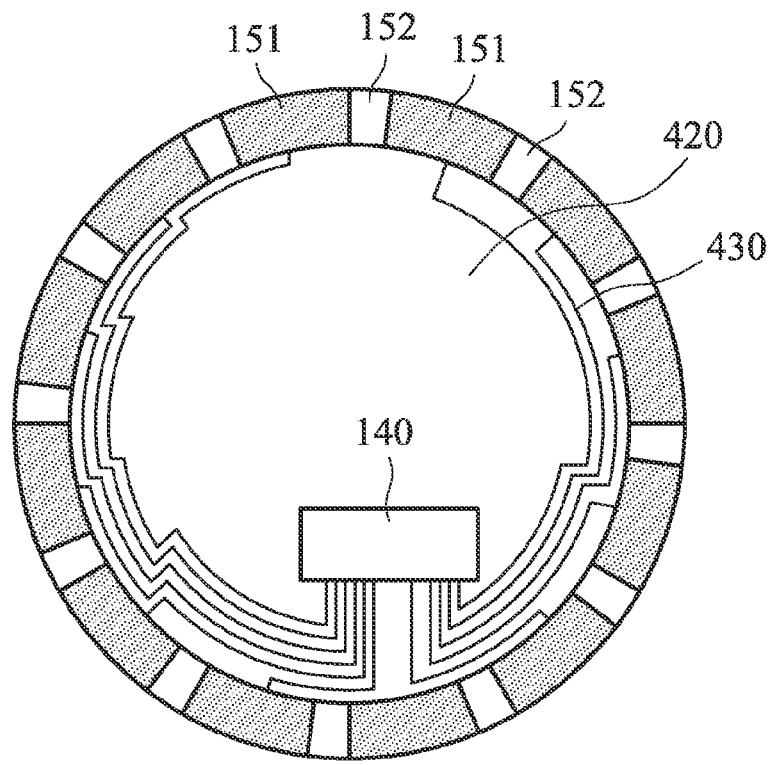
FIG. 4C is a bottom view of the back printed circuit board (PCB) 420 of the portable device 100 in accordance with an embodiment of the invention.

FIG. 4C is a bottom view of the back printed circuit board (PCB) 420 of the portable device 100 in accordance with an embodiment of the invention. The controller 140 is disposed in a predetermined location of the back PCB 420 such as the bottom side of the back PCB 420, and the wires 430 are arranged at the boundary area of the back PCB 420 to transmit the touch detection signal from each conductive segment 151 to the controller 140.

Figure 4D:
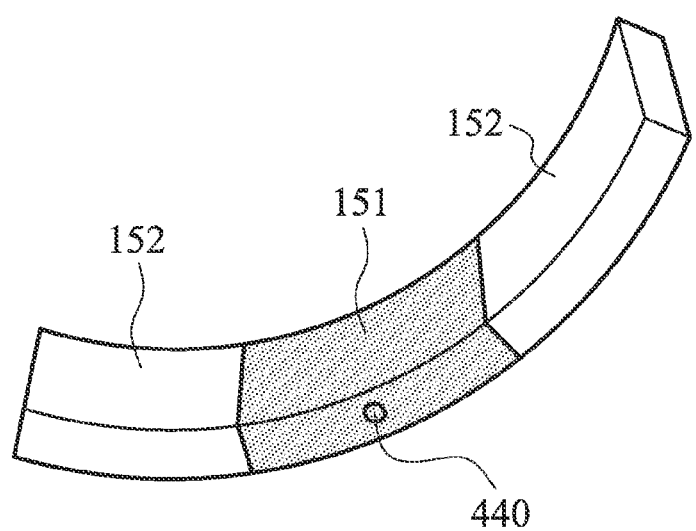
FIG. 4D is an enlarged side view of a section of the touch rim in accordance with the embodiment of FIG. 4C.

FIG. 4D is an enlarged side view of a section of the touch rim in accordance with the embodiment of FIG. 4C. A contact node 440 is disposed at the bottom side of each conductive segment 151, and one terminal of each wire 430 shown in FIG. 4C is connected to the respective contact nodes of each conductive segment 151, and another terminal of each wire 430 is connected to the controller 140 shown in FIG. 4B. Accordingly, the touch detection signal can be transmitted from each conductive segment 151 to the controller 140 via the contact node.

Figure 5:
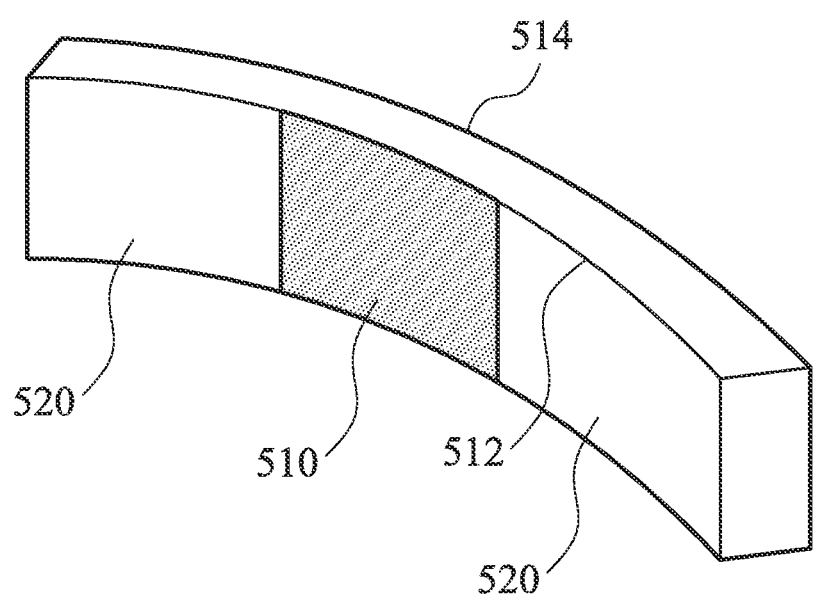
FIG. 5 is an enlarged view of a section of the touch rim in accordance with another embodiment of the invention.

FIG. 5 is an enlarged view of a section of the touch rim in accordance with another embodiment of the invention. Referring to FIG. 4A and FIG. 5, in an embodiment, The rim 410 of the touch rim 150 is made of a non-conductive material, such as enhanced porcelain, fiberglass, plastic steel, and the like, thereby ensuring the sturdiness of the touch rim 150. The touch rim 150 is also divided into a plurality of conductive segments 510 and a plurality of non-conductive segments 520. However, for each conductive segment 510, the conductive material is only coated on or covering the interior side 512 of each conductive segment 510. When the user touches his or her fingers on the exterior side 514 of each conductive segment, the touch detection signal can be transmitted via the conductive material. Additionally, a contact node similar to that in FIG. 4D can also be disposed at the bottom of each conductive segment, and the wire may connect between the conductive segment and the controller 140 via the contact node.

It should be noted that there might be several touch detection signals generated by the conductive segments 151 of the touch rim 150, and the processing unit 110 may determine the corresponding gesture based on the touch detection signals. For example, in in the embodiments of FIGS. 3A, 3C, and 3F~3K, a two-finger gesture is used. The processing unit 110 may analyze two touch detection signals from the touch rim 150, and determine the gesture performed by the user. In addition, in the embodiments of FIGS. 3B, 3D, and 3E, a three-finger gesture is used. The processing unit 110 may analyze three touch detection signals from the touch rim 150, and determine the gesture performed by the user. In the embodiments of FIGS. 3L and 3M, a single-finger gesture is used, and the processing unit 110 may analyze one touch detection signal from the touch rim 150, and determine the gesture performed by the user. It should be noted that the embodiments of FIG. 3A~FIG. 3M are for description only, and one having ordinary skill in the art will appreciate that the gesture can be extended by using more than three fingers, or using different combinations of tapping, pressing, or sliding on the touch rim 150.

Figure 6A:
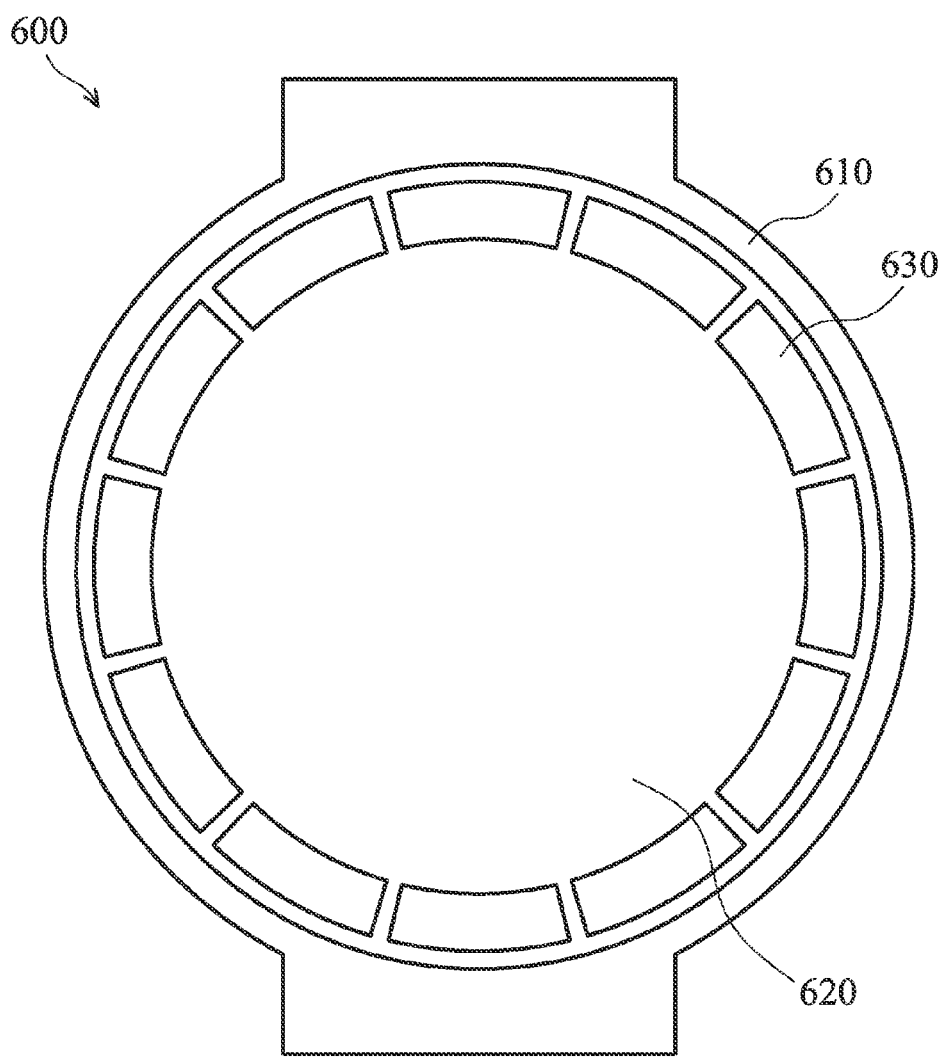
FIG. 6A is a diagram of a touch rim device 600 in accordance with an embodiment of the invention.

FIG. 6A is a diagram of a touch rim device 600 in accordance with an embodiment of the invention. The touch rim device 600 may be implemented on a portable device, a wearable device, or a cellular phone, etc. The touch rim device 600 comprises a metal enclosure 610, a protection glass 620, and a plurality of transparent conductive electrodes 630. The metal enclosure 610 can be in a shape of a circle, a rectangle, or an ellipse, but the invention is not limited thereto. The protection glass 620 is enclosed or surrounded by the metal enclosure 610. The transparent conductive electrodes 630 such as an indium tin oxide (ITO) on the protection glass 620 are deployed at the rim of the protection glass 620 and are isolated from the metal enclosure 610. Preferably, the transparent conductive electrodes 630 are disposed with a predetermined distance away from the metal enclosure 610, as shown in FIG. 6A. In addition, the transparent conductive electrodes 630 are deployed on an inner side of the protection glass 620, and are connected to a capacitance measuring circuit (not shown).

Figure 6B:
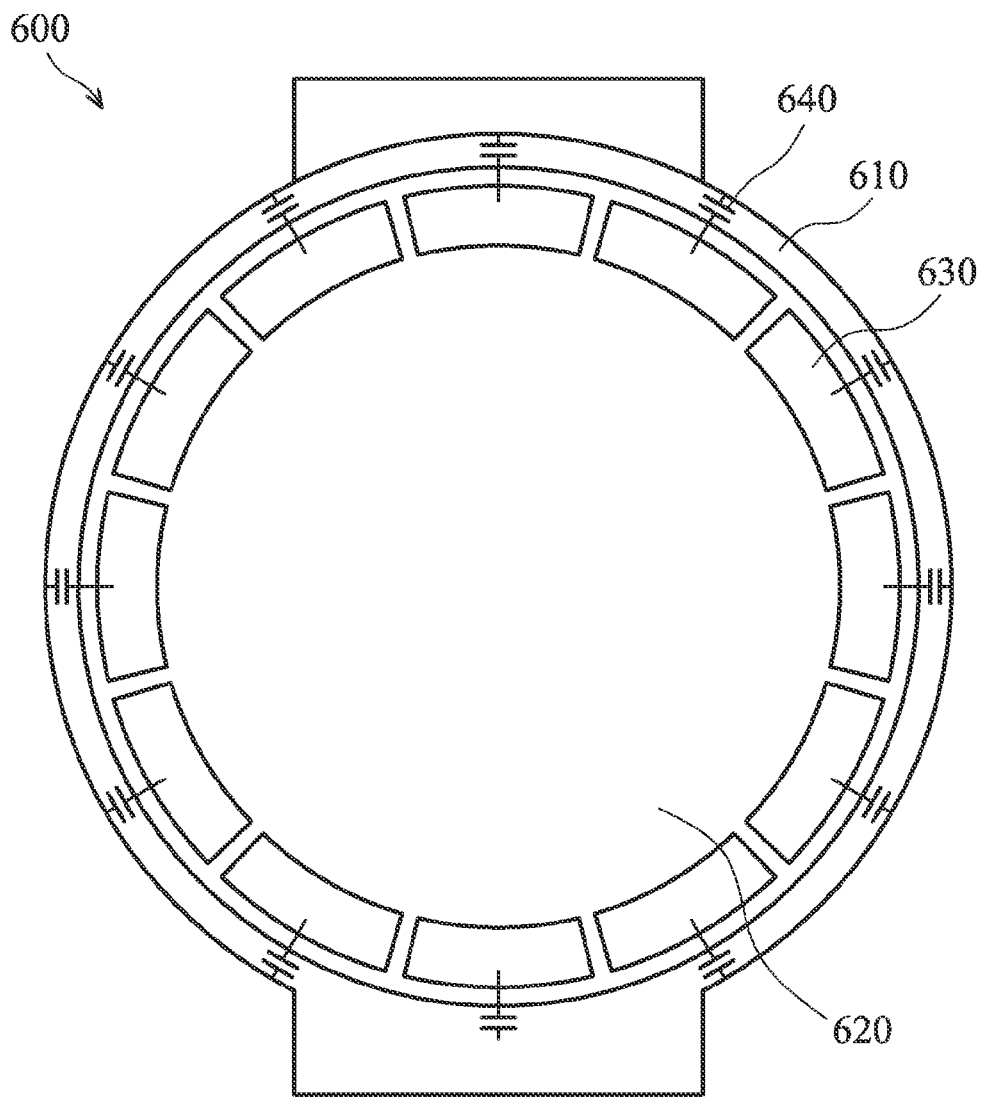
FIG. 6B is a diagram of the coupling capacitors within the touch rim device 600 in accordance with an embodiment of the invention.

FIG. 6B is a diagram of the coupling capacitors within the touch rim device 600 in accordance with an embodiment of the invention. When the elements of the touch rim device 600 are arranged in the way shown in FIG. 6A, a coupling capacitor 640 is formed between the metal enclosure 610 and each of the transparent conductive electrodes 630, as shown in FIG. 6B. When one or more fingers touch or proximate the touch rim device 600, the capacitance of the coupling capacitors 640 will change. Accordingly, the touch rim device 600 can be used to detect a gesture such as a single touch, a multi-touch, a sliding gesture, etc., as an operation command.

Figure 7:
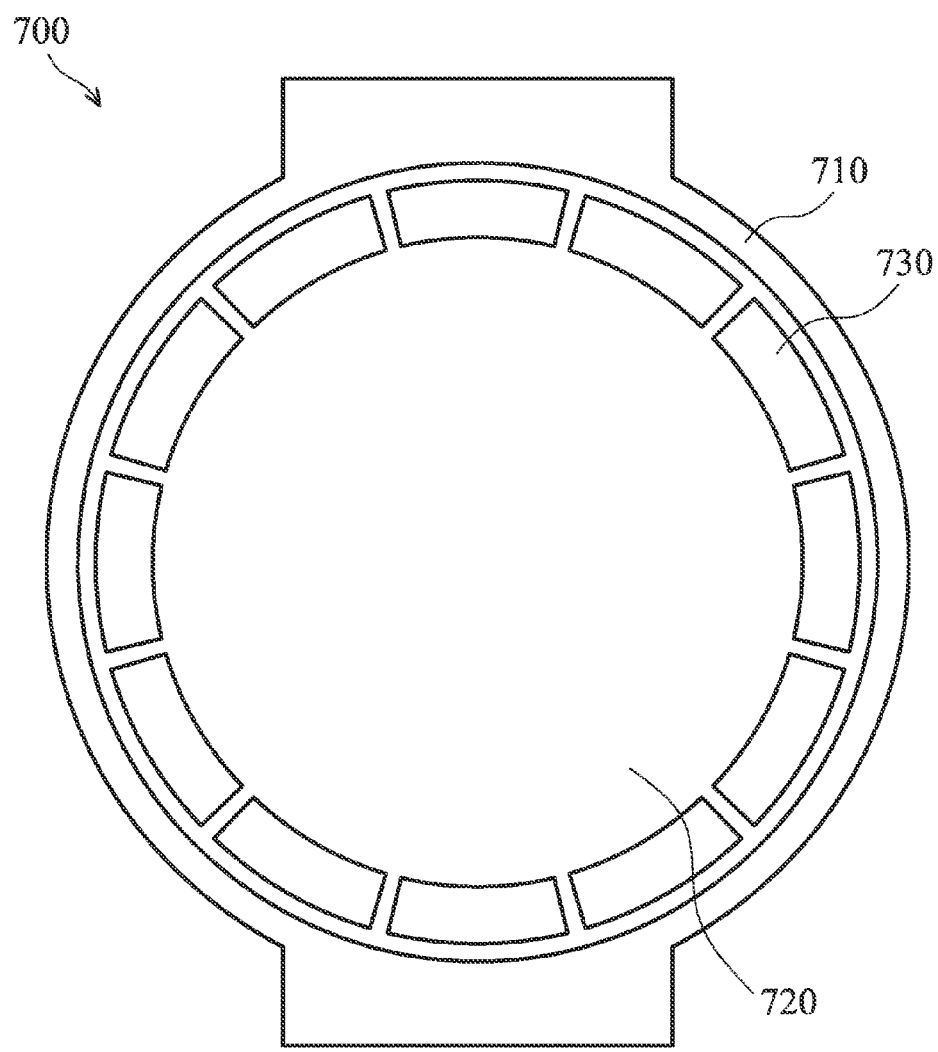
FIG. 7 is a diagram of the touch rim device in accordance with another embodiment of the invention.

FIG. 7 is a diagram of the touch rim device in accordance with another embodiment of the invention. The touch rim device 700 may be implemented on a portable device, a wearable device, or a cellular phone, etc. The touch rim device 700 comprises a metal rim 710, a protection glass 720, and a plurality of conductive electrodes 730. The metal rim 710 can be in a shape of a circle, a rectangle, or an ellipse, but the invention is not limited thereto. The protection glass 720 is enclosed or surrounded by the metal rim 710. Preferably, the conductive electrodes 730 are positioned along an inner side of the protection glass 720 and are isolated from the metal rim 710. Preferably, the conductive electrodes 730 are kept a predetermined distance away from the metal rim 710, as shown in FIG. 7A. Alternatively, a predetermined dielectric material (not shown) is filled in the space between the metal rim 710 and the conductive electrodes 730. Preferably, the predetermined dielectric material, the metal rim 710, and the protection glass 720 are manufactured by a coating process. Alternatively, the metal rim 710 can be replaced by a plurality of conductive metal parts.

Figure 8A:
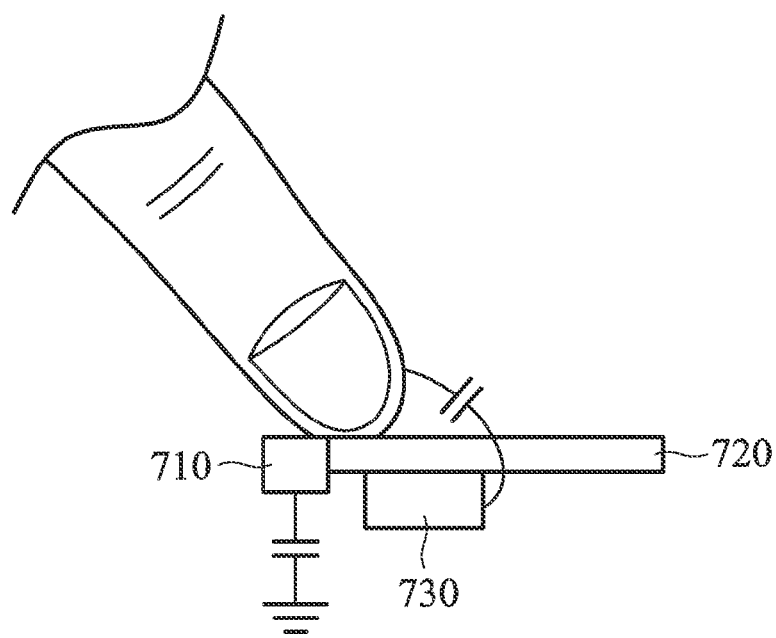
FIG. 8A is an enlarged side view of a portion of the touch rim device in accordance with an embodiment of the invention.
Figure 8B:
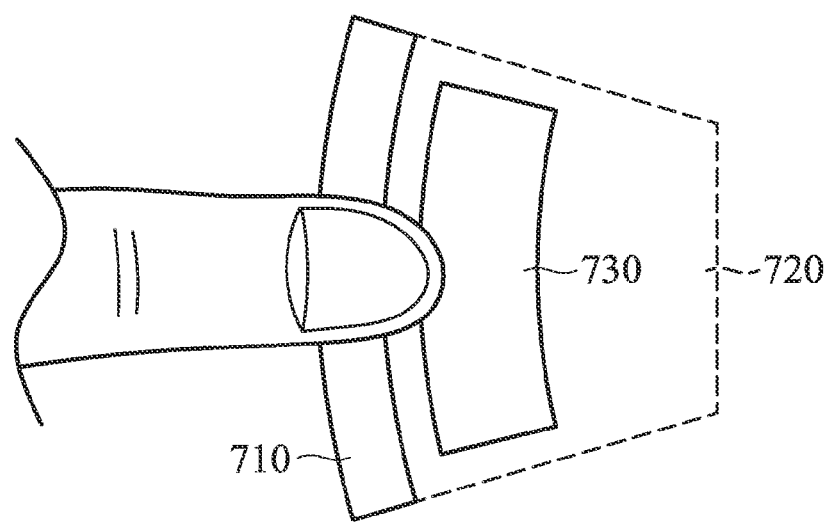
FIG. 8B is a top view of a portion of the touch rim device in accordance with an embodiment of the invention.

FIG. 8A is an enlarged side view of a portion of the touch rim device in accordance with an embodiment of the invention. FIG. 8B is a top view of a portion of the touch rim device in accordance with an embodiment of the invention. Referring to FIG. 7 and FIG. 8A, in a scenario, a user's finger may directly touch one of the metal parts of the metal rim 710, as shown in FIG. 8A. Thus, the self-capacitance of the touched metal part relative to the ground may change significantly because the human body is a big capacitor, and a great amount of electrons on the touch rim device 700 are drawn to the human body. Accordingly, the change of the self-capacitance of each metal part can be applied as a trigger for mutual capacitance detection.

Figure 9A:
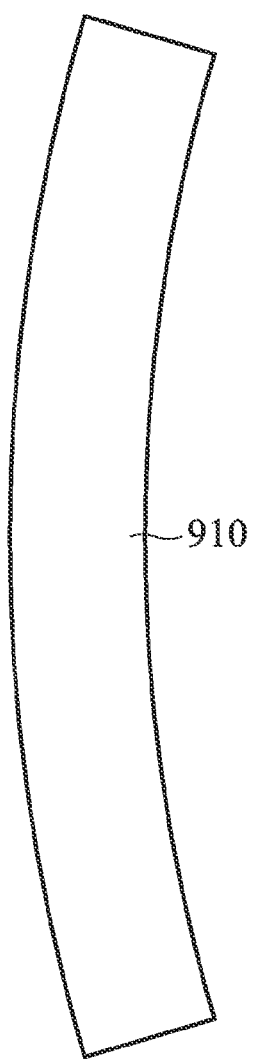
FIG. 9A is a top view of a portion of the metal rim in accordance with an embodiment of the invention.
Figure 9B:
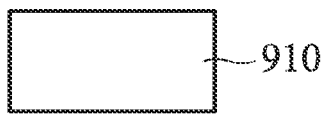
FIG. 9B is a side view of a portion of the metal rim in accordance with an embodiment of the invention.
Figure 9C:
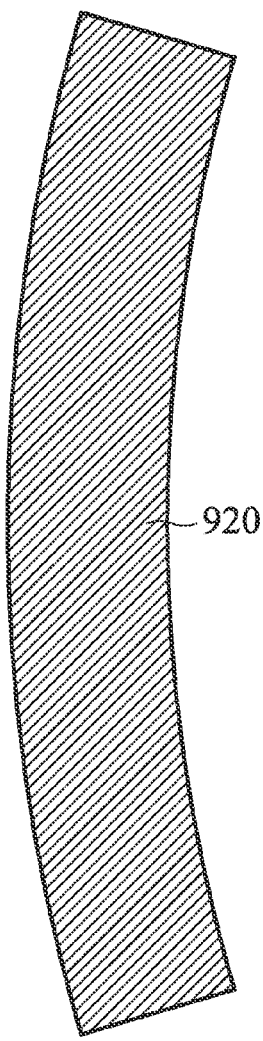
FIG. 9C is a top view of a portion of the metal rim coated with a dielectric layer in accordance with an embodiment of the invention.
Figure 9D:
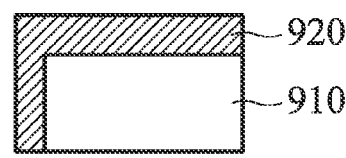
FIG. 9D is a side view of a portion of the metal rim coated with a dielectric layer in accordance with an embodiment of the invention.
Figure 9E:
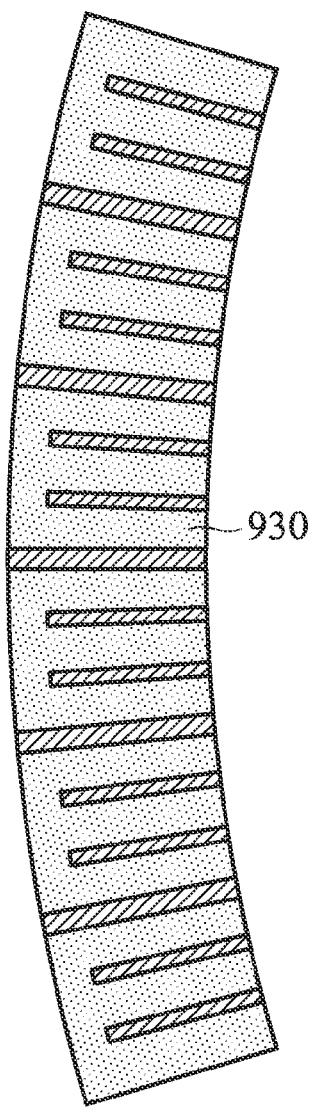
FIG. 9E is a top view of a portion of the metal rim coated with a dielectric layer and metal segments in accordance with an embodiment of the invention.
Figure 9F:
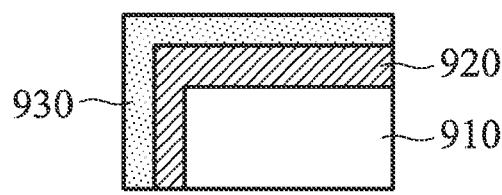
FIG. 9F is a side view of a portion of the metal rim coated with a dielectric layer and metal segments in accordance with an embodiment of the invention.

FIG. 9A is a top view of a portion of the metal rim in accordance with an embodiment of the invention. FIG. 9B is a side view of a portion of the metal rim in accordance with an embodiment of the invention. FIG. 9C is a top view of a portion of the metal rim coated with a dielectric layer in accordance with an embodiment of the invention. FIG. 9D is a side view of a portion of the metal rim coated with a dielectric layer in accordance with an embodiment of the invention. FIG. 9E is a top view of a portion of the metal rim coated with a dielectric layer and metal segments in accordance with an embodiment of the invention. FIG. 9F is a side view of a portion of the metal rim coated with a dielectric layer and metal segments in accordance with an embodiment of the invention. The top view and side view of the metal rim 910 are shown in FIG. 9A and FIG. 9B, respectively. A dielectric layer 920 such as a plastic layer is deposited, e.g. coated, on the metal rim 910, and top view and the side view of the coated metal rim 910 are shown in FIG. 9C and FIG. 9D, respectively. In addition, a plurality of metal segments 930 such as copper or ITO, are deposited, e.g. coated, above the dielectric layer 920. The top view and side view of the metal rim 910 coated with the dielectric layer and metal segments are shown in FIG. 9E and FIG. 9F, respectively. Each of the metal segments 930 is isolated from each other with a predetermined distance, and the metal segments 930 are isolated from the metal rim 910. In some embodiments, shapes of a longer edge are preferred for the metal segments 930. In addition, the metal rim 910 and the metal segments 930 are coupled to a mutual capacitance detection circuit (not shown). Furthermore, each of the metal segments 930 is coupled to a self-capacitance measuring circuit having low power and a low scan rate (not shown).

It should be noted that a coupling capacitor is formed between the metal rim 910 and each metal segment 930. When one or more fingers touch one or more metal segments 930, direct contact to the metal segments 930 and fringe effect disturbed by fingers change the capacitance of the coupling capacitors between the touched metal segments 930 and the metal rim 910. In addition, when there is no touch action on the metal rim 910, only the self-capacitance measuring circuit of each metal segment having low power and a low scan rate is activated. When a touch event of one or more fingers touching on the metal rim 910 occurs, the mutual capacitance detection circuit is activated for touch detection. Accordingly, the coupling capacitors formed between the metal segments 930 and the metal rim 910 provide better touch detection performance by using the implementation shown in FIGS. 9A~9F of the invention.

Figure 10:
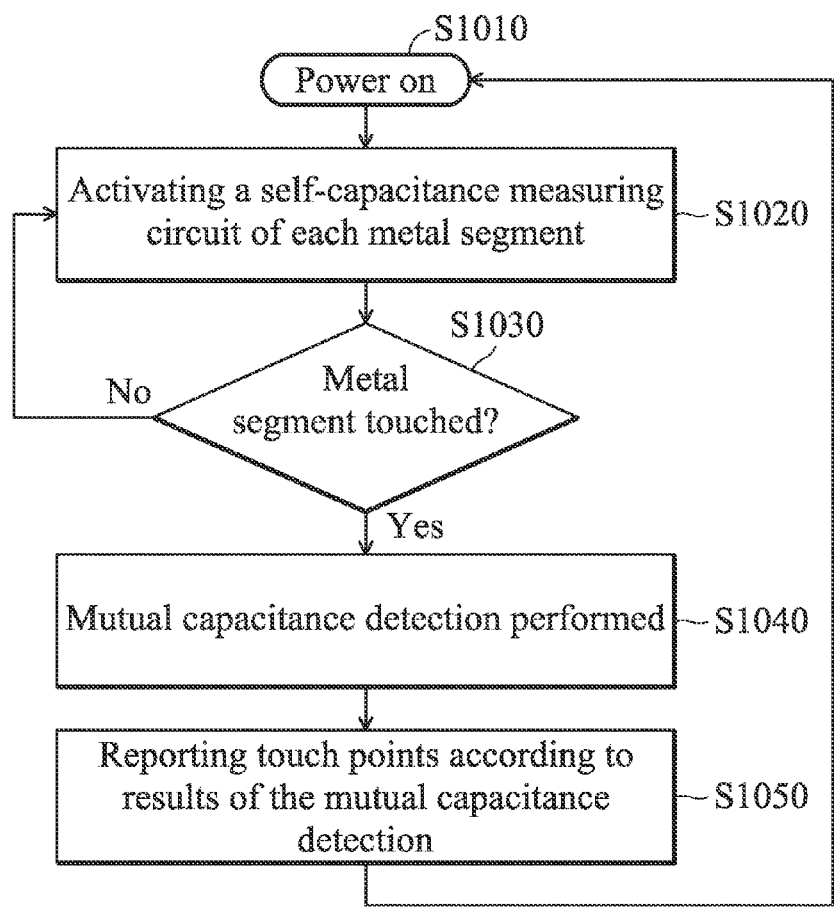
FIG. 10 is a flow chart of a touch detection method in accordance with an embodiment of the invention.

FIG. 10 is a flow chart of a touch detection method in accordance with an embodiment of the invention. Referring to FIGS. 9A~9F and FIG. 10, in step S1010, the touch rim device 900 is powered on. In step S1020, a self-capacitance measuring circuit of each metal segment 930 is activated. It should be noted that the self-capacitance measuring circuit for each metal segment 930 has low power and a low scan rate in order to reduce power consumption. In step S1030, the self-capacitance measuring circuit determines whether the associated metal segment 930 is touched. If so, step S1040 is performed. Otherwise, step S1020 is performed. In step S1040, mutual capacitance detection is performed on the coupling capacitor between the touched metal segment 930 and the metal rim 910. In step S1050, touch points are reported according to results of the mutual capacitance detection.

Figure 11:
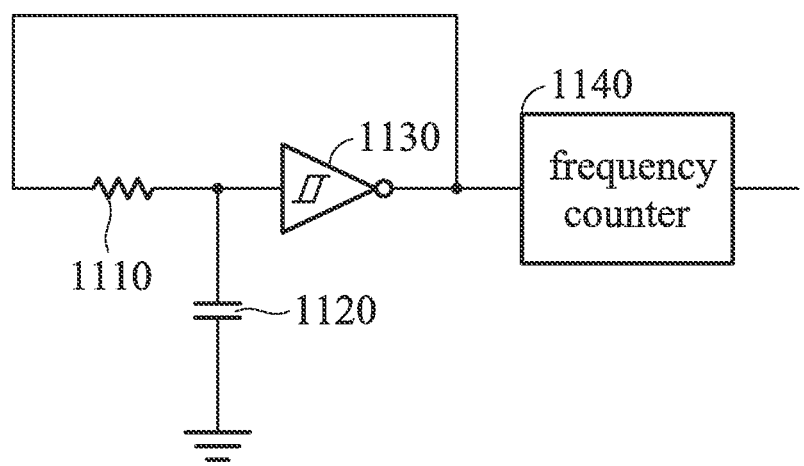
FIG. 11 is a schematic diagram of a self-capacitance detection circuit in accordance with an embodiment of the invention.

FIG. 11 is a schematic diagram of a self-capacitance detection circuit in accordance with an embodiment of the invention. Referring to FIG. 9E and FIG. 11, the self-capacitance detection circuit 1100 comprises a resistor 1110, a capacitor 1120, a square wave oscillator 1130, and a frequency counter 1140. The capacitor 1120 is the self-capacitance of each metal segment 930 relative to the ground. Thus, a square wave is generated at the output of the square wave oscillator 1130. The frequency counter 1140 then checks the touch state of each metal segment 930. For example, when the metal segment 930 is not touched, the frequency of the output square wave can be maintained at a predetermined frequency. When the metal segment 930 is touched, the self-capacitance of the touched metal segment 930 may change significantly, and thus the frequency of the output square wave may change accordingly. The frequency counter 1140 may detect the frequency change of the output square wave of the square wave oscillator 1130 and determine the touch state of the metal segment 930, e.g. touched or untouched. When it is determined that one of metal segment 930 is touched, the mutual capacitance detection circuit shown in FIG. 12 is activated.

Figure 12:
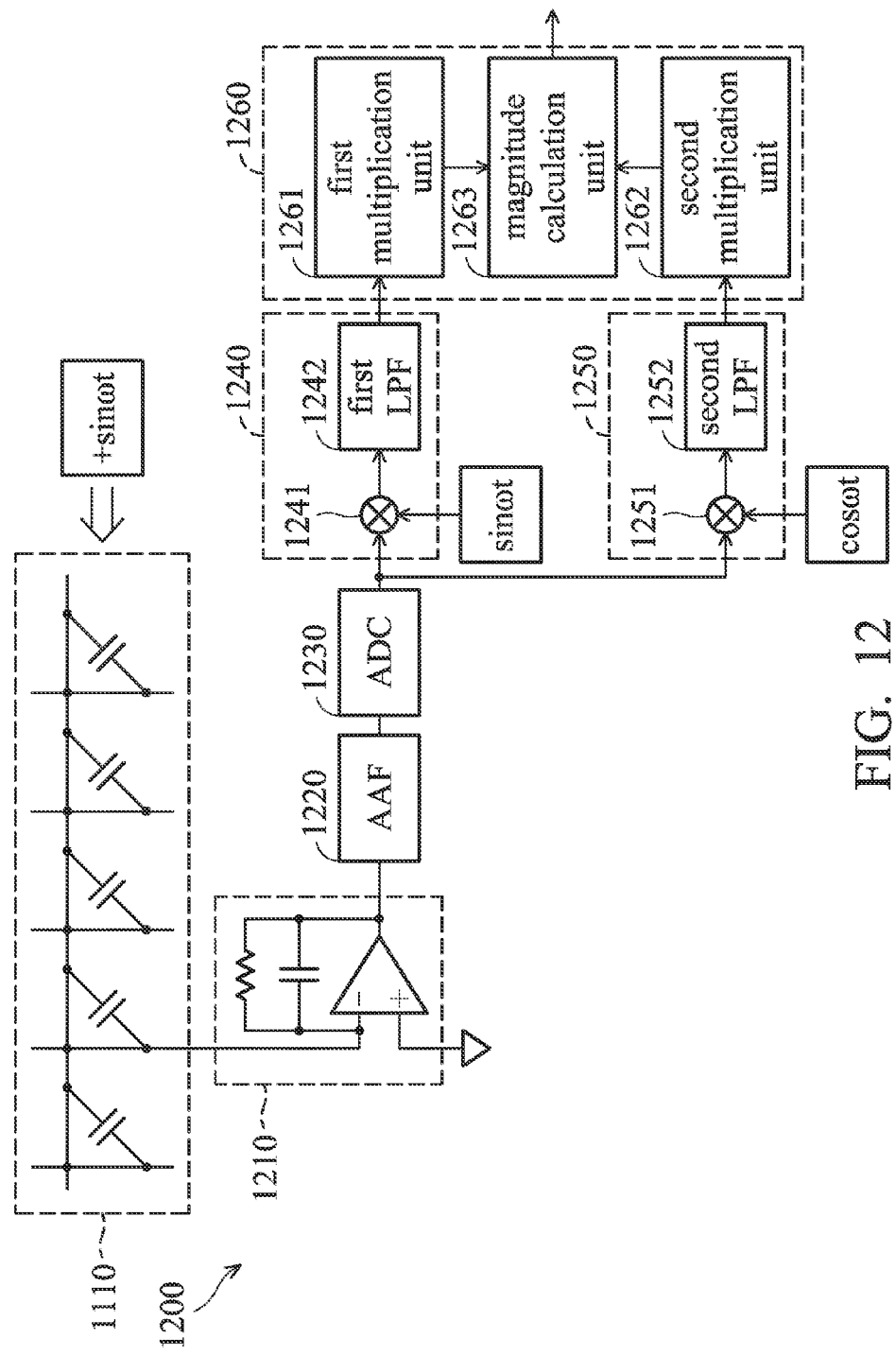
FIG. 12 is a schematic diagram of the mutual capacitance detection circuit in accordance with an embodiment of the invention.

FIG. 12 is a schematic diagram of the mutual capacitance detection circuit in accordance with an embodiment of the invention. The mutual capacitance detection circuit 1200 comprises a transducer amplifier 1210, an anti-aliasing filter (AAF) 1220, an analog-to-digital converter (ADC) 1230, a first demodulator 1240, a second demodulator 1250, and a determination circuit 1260. The transducer amplifier 1210 receives analog sensing output signals, e.g. square waves, from the self-capacitance detection circuit 1100 of each metal segment 930. The amplifier output of the transducer amplifier 1210 is processed by the AAF 1220 to restrict the bandwidth of the amplifier output to approximately satisfy the sampling theorem. Next, the ADC 1230 converts the filter output of the AAF 1220 into a digital touch sense signal.

The first demodulator 1240 is configured to demodulate the touch sense signals with a first oscillation signal to generate a plurality of first demodulated signals. The second demodulator 1250 is configured to demodulate the digital touch sense signals with a second oscillation signal to generate a plurality of second demodulated signals. By way of example, but not limited, the first oscillation signal, the second oscillation signal have the same frequency. In the embodiment, the first oscillation signal may be $\sin(\omega t)$, and the second oscillation signal may be $\cos(\omega t)$.

For example, the first demodulator 1240 comprises a first mixer 1241 and a first low-pass filter (LPF) 1242, where the first mixer is arranged for mixing each touch sense signal with the first oscillation signal $\sin(\omega t)$ to generate a corresponding first mixed signal, and the first LPF 1242 is arranged for performing a low-pass filtering operation upon the first mixed signal to generate a corresponding first demodulated signal. The second demodulator 1250 comprises a second mixer 1251 and a second LPF 1252, where the second mixer 1251 is arranged for mixing each touch sense signal with the second oscillation signal $\cos(\omega t)$ to generate a corresponding second mixed signal, and the second LPF 1252 is arranged for performing a low-pass filtering operation upon the second mixed signal to generate a corresponding second demodulated signal.

The determination circuit 1260 is arranged for determining the capacitance according to the first demodulated signal and the second demodulated signal. For example, the determination circuit 1260 comprises a first multiplication unit 1261, a second multiplication unit 1262, and a magnitude calculation unit 1263. The first multiplication unit 1261 performs matrix multiplication according to a decoding matrix (not shown) and the first demodulated signals, and accordingly generates a plurality of first matrix elements, where k=1 to n. Similarly, the second multiplication unit 1262 performs matrix multiplication according to the decoding matrix and the second demodulated signal, and accordingly generates a plurality of second matrix elements, where k=1 to n. It should be noted that the decoding matrix is an inverse of the encoding matrix which defines a plurality of sign values, and the stimulation signals, i.e. input of the transducer amplifier 1210, are set by the common modulation carrier $\sin(\omega t)$ and the plurality of sign values defined in the encoding matrix.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A portable device, comprising:
    a display;
    a control circuit;
    a processor;
    a housing, wherein the control circuit and the processor are disposed inside the housing; and
    a touch sensor, configured to detect a gesture performed on the touch rim to generate at least one touch detection signal, wherein the touch sensor comprises a rim, and the rim is made of a non-conductive material,
    wherein the control circuit is configured to receive the at least one touch detection signal from the touch rim, and transmit the at least one touch detection signal to the processor,
    wherein the processor analyzes the at least one touch detection signal to determine the gesture performed on the touch sensor, and performs an operation associated with the gesture, wherein the rim is divided into a plurality of conductive segments, and each conductive segment is implemented by coating or covering a conductive material on an interior side of the rim, and each two neighboring conductive segments are separated by a non-conductive segment.

2. The portable device as claimed in claim 1, wherein the touch sensor is disposed on the upper section of the housing.

3. The portable device as claimed in claim 1, wherein the touch sensor is disposed around the housing.

4. The portable device as claimed in claim 1, wherein the touch sensor is disposed surrounding the display.

5. The portable device as claimed in claim 1, wherein a contact node is disposed at the bottom side of each conductive segment, and the touch detection signal from each conductive segment is transmitted to the control circuit via the contact node.

6. The portable device as claimed in claim 1, wherein the at least one touch detection signal comprises a first touch detection signal, and a second touch detection signal, wherein when the processor determines that both the first touch detection signal and the second touch detection signal indicate pressing on the touch sensor for a predetermined time, the processor determines a first gesture.

7. The portable device as claimed in claim 1, wherein the at least one touch detection signal comprises a first touch detection signal, and a second touch detection signal, wherein when the processor determines that the first touch detection signal indicates pressing on the touch sensor and the second touch detection signal indicates tapping on the touch sensor a predetermined number of times, the processor determines a second gesture.

8. The portable device as claimed in claim 1, wherein the at least one touch detection signal comprises a first touch detection signal, and a second touch detection signal, wherein when the processor determines that the first touch detection signal and the second detection signal indicate sliding on the touch sensor clockwise or counterclockwise, the processor determines a third gesture.

9. The portable device as claimed in claim 1, wherein the at least one touch detection signal comprises a first touch detection signal, and a second touch detection signal, wherein when the processor determines that the first touch detection signal and the second detection signal indicate sliding on the touch sensor clockwise or counterclockwise, the processor determines a fourth gesture.

10. The portable device as claimed in claim 1, wherein the at least one touch detection signal comprises a first touch detection signal, and a second touch detection signal, wherein when the processor determines that the first touch detection signal indicates pressing on the touch sensor and the second touch detection signal indicates sliding on the touch sensor clockwise or counterclockwise, the processor determines a fifth gesture.

11. The portable device as claimed in claim 1, wherein the at least one touch detection signal comprises a first touch detection signal, and a second touch detection signal, wherein the at least one touch detection signal further comprises a third touch detection signal, and when the processor determines that the first touch detection signal and the second touch detection signal indicate pressing on the touch sensor and the third touch detection signal indicates tapping on the touch sensor a predetermined number of times, the processor determines a sixth gesture.

12. The portable device as claimed in claim 1, further comprising:
a back printed circuit board, wherein the control circuit is disposed on a bottom side of the back printed circuit board.

13. A portable device, comprising:
a touch sensor, configured to detect a gesture performed on the touch sensor to generate at least one touch detection signal; and
a control circuit is configured to receive the at least one touch detection signal from the touch sensor,
wherein the touch sensor comprises a rim, and the rim is made of a non-conductive material,
wherein the rim is divided into a plurality of conductive segments, and each conductive segment is implemented by coating or covering a conductive material on an interior side of the rim, and each two neighboring conductive segments are separated by a non-conductive segment.

14. The portable device as claimed in claim 13, further comprising: a display, and a housing, wherein the display is disposed in a first side of the housing,
wherein a contact node is disposed on each conductive segment closed to a second side of the housing that is opposite to the first side, and the touch detection signal from each conductive segment is transmitted to the control circuit via the contact node.

* * * * *